United States Patent [19]

Krause

[11] Patent Number: 4,607,775
[45] Date of Patent: Aug. 26, 1986

[54] DEVICE FOR CUTTING GLASS FIBERS
[75] Inventor: Dieter Krause, Munich, Fed. Rep. of Germany
[73] Assignee: Siemens Aktiengesellschaft, Berlin & Munich, Fed. Rep. of Germany
[21] Appl. No.: 497,417
[22] Filed: May 24, 1983
[30] Foreign Application Priority Data
Jun. 3, 1982 [DE] Fed. Rep. of Germany ....... 3221010
[51] Int. Cl.$^4$ ............................................. B26F 3/00
[52] U.S. Cl. ..................................... 225/96.5; 30/175
[58] Field of Search ............................ 30/175; 83/879; 225/101, 96, 96.5

[56] References Cited
U.S. PATENT DOCUMENTS

| 2,254,738 | 9/1941 | Gamache | 30/175 |
| 4,225,072 | 9/1980 | Reeves | 225/96.5 X |
| 4,315,584 | 2/1982 | Wuestner | . |
| 4,413,763 | 11/1983 | Lukas | 225/101 |
| 4,463,886 | 8/1984 | Thornton | 225/96.5 |

FOREIGN PATENT DOCUMENTS 2925070  5/1982  Fed. Rep. of Germany .
1378415 12/1974  United Kingdom ............... 225/101

Primary Examiner—E. R. Kazenske
Assistant Examiner—Willmon Fridie, Jr.
Attorney, Agent, or Firm—Hill, Van Santen, Steadman & Simpson

[57] ABSTRACT

An improved device for cutting glass fibers, which device has an anvil with a seating surface, a pair of clamps for grasping the fibers and holding them on the seating surface with the desired prestress, a notching tool movable in a plane perpendicular to the axis of fibers for notching each of the fibers so that they can be separated at the notch, characterized by a slot in the seating surface of the anvil at each of the glass fibers, said slot proceeding symmetrically relative to the notching plane of the notching tool. The provision of the improvement increases the quality of the cleavage faces of the cut fibers.

2 Claims, 2 Drawing Figures

DEVICE FOR CUTTING GLASS FIBERS

BACKGROUND OF THE INVENTION

The present invention is directed to a device for cutting glass fibers which device has an anvil, a pair of clamps on each side of the anvil for clamping the fibers with each of the fibers extending parallel to each other over the anvil and means for moving the clamps to prestress the fibers in an axial direction so that when the fibers are subsequently notched or scratched while on the anvil with the assistance of a notching or scratching tool which is moved in a direction perpendicular to the axis of the fibers, the fibers will be separated at the point of notching.

A typical device for separating glass fibers is described in U.S. Pat. No. 4,315,584 which was based on German LP No. 29 25 070. As disclosed in this patent, fibers are clamped on each side of an anvil with the clamps being moved apart while a chisel or cutting tool scratches or notches the fibers to allow separation at the point of the notch. In this and other known devices of this type, the end faces of the cut glass fibers do not exhibit the precision which is required for further use so that subsequent working steps at the end face are necessary. It has turned out that only approximately 30% of the notched cut glass fibers exhibit a usable cleavage face which is determined as the angular deviation of the cut surface being less than 1% relative to the fiber axis and the quality of the cut surface is free of disruptive notches, cracks and other irregularities.

SUMMARY OF THE INVENTION

The present invention is directed to providing an improved device for cutting glass fibers, which device provides a greatly improved quality for the cut faces of the fibers. This object is obtained by providing the improvement for a device for separating glass fibers, which device comprises an anvil positioned between a pair of common clamps for holding the waveguides or glass fibers parallel to one another on the anvil with at least one of the clamps being movable, means for applying a force on the movable clamp to provide an axial tensile force, notching or scratching means movable in a plane perpendicular to the axis of the glass fibers for notching each of the fibers to enable separation at the notch. The improvement comprises a slot which is symmetrical relative to the notching plane of the notching means being provided in the anvil at least at a seating surface of each glass fiber. Preferably, the width of the slot in the anvil is selected to be of such a size that approximately symmetrical tension distribution in the cross-section of the glass fibers is achieved at the scratching or notching location during the scratching or notching operation. It has been demonstrated that the share of usable cleavage faces, which are produced by this improved device, can be increased to over 60% of the faces.

DESCRIPTION OF THE PREFERRED EMBODIMENTS

Figure 1:
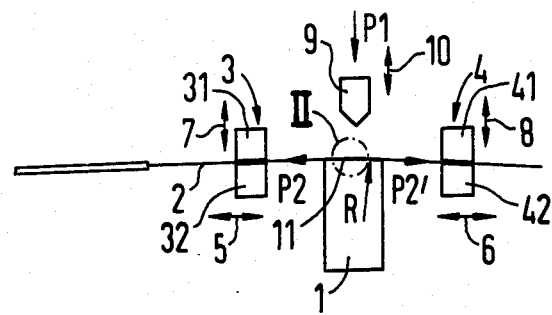
FIG. 1 is a schematic view of the device according to the present invention.

The principles of the present invention are particularly useful in a device schematically illustrated in FIG. 1 which device includes an anvil 1 having a curved seating surface 11 with a radius of curvature R. A glass fiber 2 is axially prestressed over the surface 11 by being clamped in chucking devices 3 and 4 which are disposed on opposite sides of the anvil 1 and are moved in the direction of the arrows 5 and 6 by means for applying a force to the clamps to move the clamps, for example, by means of pivoting the clamps. The above arrangement is disclosed and discussed in greater detail in U.S. Pat. No. 4,315,584, whose disclosure is incorporated herein by reference thereto.

Each of the two chucking devices 3 and 4 have clamping jaws with the device 3 having jaws 31 and 32 which may be moved relative to one another as indicated by the arrow 7 while the jaws 41 and 42 form the chucking device 4 and are movable in the direction indicated by the arrow 8. The anvil 1 preferably exhibits the curved seating surface 11 so that the glass fibers 2 are not only well seated against the surface 11 of the anvil but are also not bent or pinched at the edges of the anvil when the chucking devices 3 and 4 are moved in order to obtain a specific tension force which is indicated by the arrows P2 and P2'. When the glass fiber 2 is under the prescribed tension force, then a notching tool or scratching chisel 9 of a notching or scratching means is lowered onto the glass fibers 2 in a direction of an arrow 10 with a compressive force P1 and is then moved in a plane which extends perpendicular to the axis of the fibers to initiate the cutting or notching operation. Despite observing the requirements necessary for the parting operation concerning the application of the tension forces P2 and P2' onto each of the fibers and the compressive force P1 for the chisel 9, the end faces, as already explained above, will be produced and these end faces will exhibit angular fluctuations relative to the fiber axis or will not be free of disruptive notches, cracks and other irregularities.

Figure 2:
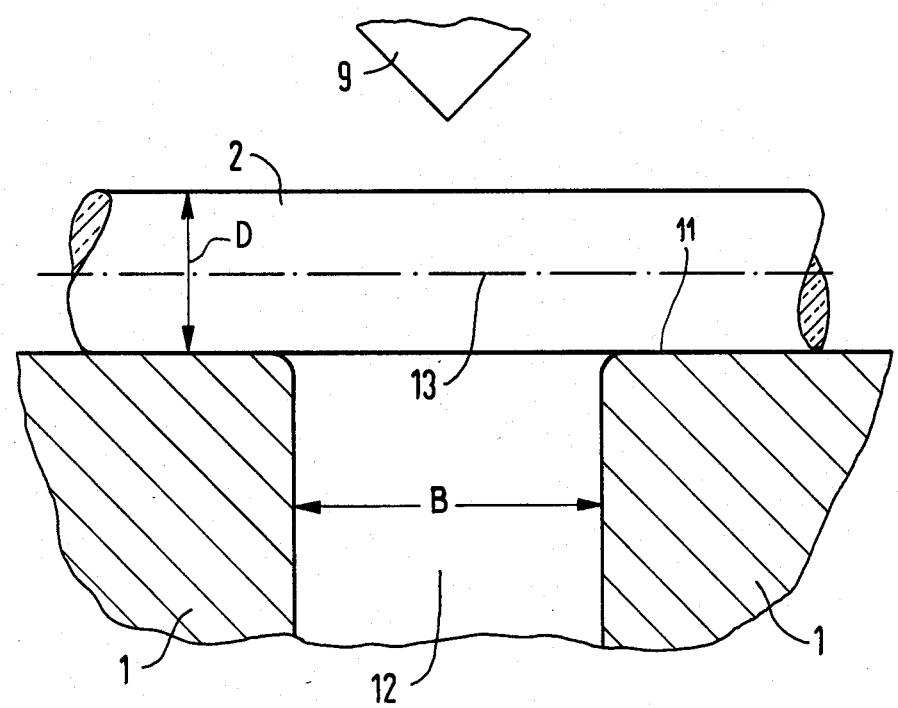
FIG. 2 is an enlarged cross-sectional view with portions in elevation for purposes of illustration taken in the circle II of FIG. 1.

It has now been discovered that when a correspondingly broad slot 12 (FIG. 2) is introduced in the surface 11 of the anvil 1, a very considerable improvement of the quality of the cleavage face can be achieved because an approximately symmetrical tension distribution in the cross-section of the glass fiber is then achieved at the notch location during the scratching operation. As mentioned hereinabove, the width of the slot 12 is selected to be of such a size that approximately a symmetrical tension distribution in the cross-section of the fiber is achieved. In the illustration of FIG. 2, the axis of the fiber is indicated at 13 and it is noted that the tool 9 during the notching operation moves in a plane perpendicular to this axis 13.

Although various minor modifications may be suggested by those versed in the art, it should be understood that I wish to embody within the scope of the patent granted hereon, all such modifications as reasonably and properly come within the scope of my contribution to the art.

It has further been discovered that an approximately symmetrical tension distribution in the cross-section of each of the glass fibers is achieved, if the diameter D of the fibers being cut and the width W of the slot 12 in the seating surface 11 of the anvil 1 is in the relation of $D/W = 0.125$ to $0.25$, preferably $D/W = 0.15$ to $0.16$.

For example to cut a glass fiber 2 with a diameter of D=125 μm the width of the slot 12 is selected to be W=800 μm.

I claim:

1. In a device for cutting glass fibers having a diameter, said device having an anvil positioned between a pair of common clamps, said clamps holding the waveguides parallel to one another on an upper surface of the anvil, at least one of said clamps being movable, means for moving the movable clamp to provide an axially directed tensile force on each of the fibers, means positioned above the anvil and having a notching tool movable in a direction extending perpendicular to the axis of the fibers for notching each of the fibers to obtain a subsequent separation of the fibers at the notches, the improvement comprising a slot in the upper surface of the anvil at least at a seating surface of each glass fiber thereon, said slot being symmetrical relative to the notching plane of the notching tool and being of a selected width for generating an approximately symmetrical tension distribution in the cross-section of each of the glass fibers across said slot at the notch location during the notching operation, said slot width and the fiber diameter having a diameter/width ratio in a range of 0.125 to 0.25.

2. In a device according to claim 1, wherein the diameter/width ratio is in a range of 0.15 to 0.16.

* * * * *